US010609787B2

(12) United States Patent
Meerbeek et al.

(10) Patent No.: US 10,609,787 B2
(45) Date of Patent: Mar. 31, 2020

(54) RECOMMENDATION ENGINE FOR A LIGHTING SYSTEM

(71) Applicant: SIGNIFY HOLDING B.V., Eindhoven (NL)

(72) Inventors: Berent Willem Meerbeek, Veldhoven (NL); Dirk Valentinus René Engelen, Heusden-Zolder (BE); Anthonie Hendrik Bergman, Nuenen (NL); Jochen Renaat Van Gheluwe, Lommel (BE); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/481,169

(22) PCT Filed: Dec. 21, 2017

(86) PCT No.: PCT/EP2017/084169
§ 371 (c)(1),
(2) Date: Jul. 26, 2019

(87) PCT Pub. No.: WO2018/137868
PCT Pub. Date: Aug. 2, 2018

(65) Prior Publication Data
US 2019/0394855 A1    Dec. 26, 2019

(30) Foreign Application Priority Data

Jan. 27, 2017  (EP) .................................... 17153520

(51) Int. Cl.
*H05B 37/02*    (2006.01)

(52) U.S. Cl.
CPC ............................. *H05B 37/0227* (2013.01)

(58) Field of Classification Search
CPC .. H05B 37/02; H05B 37/029; H05B 37/0227; H05B 37/0245; H05B 37/0272;
(Continued)

(56) References Cited

U.S. PATENT DOCUMENTS 9,814,123 B2 * 11/2017 Van De Sluis ...... H05B 37/029
9,824,125 B2 * 11/2017 Lashina ............ G06F 16/24578
(Continued)

FOREIGN PATENT DOCUMENTS

WO    2013186665 A2    12/2013
WO    2013186670 A2    12/2013
(Continued)

*Primary Examiner* — Haissa Philogene
(74) *Attorney, Agent, or Firm* — Meenakshy Chakravorty

(57) ABSTRACT

A recommendation engine for a lighting system comprises a recommendation component for generating recommendation messages to recommend lighting effects for the lighting system; at least one data input for receiving, from a data source, data pertaining to a user of the lighting system; and a receptiveness component configured to use the received data to compute a current receptiveness level for the user indicating a current receptiveness of the user to receiving recommendations; wherein the recommendation component is configured to selectively cause recommendation messages to be outputted to the user via a user interface, to recommend lighting effects for the lighting system, in dependence on the current receptiveness level.

14 Claims, 4 Drawing Sheets

(58) Field of Classification Search
CPC ......... G06F 16/24578; G06F 16/90332; G06F 17/50; H04L 51/10; H04L 67/125; H04L 67/10

See application file for complete search history.

(56) References Cited

U.S. PATENT DOCUMENTS

| | | | |
|---|---|---|---|
| 9,958,291 B1* | 5/2018 | Shunturov | G01D 4/002 |
| 9,964,982 B1* | 5/2018 | Nguyen | G05F 1/66 |
| 2011/0264528 A1 | 10/2011 | Whale | |
| 2012/0116544 A1 | 5/2012 | Shrubsole | |
| 2013/0254194 A1 | 9/2013 | Hadatsuki et al. | |
| 2015/0161137 A1 | 6/2015 | Lashina et al. | |
| 2016/0073474 A1 | 3/2016 | Van De Sluis et al. | |
| 2019/0340306 A1* | 11/2019 | Harrison | G06F 17/2785 |

FOREIGN PATENT DOCUMENTS

| | | |
|---|---|---|
| WO | 2014162279 A1 | 10/2014 |
| WO | 2015185704 A1 | 12/2015 |
| WO | 2018011036 A1 | 1/2018 |
| WO | 2018037002 A1 | 3/2018 |

\* cited by examiner

| Context parameters | | Preferred light setting | | |
|---|---|---|---|---|
| Activity | Location | Light intensity | Color scheme | Dynamics |
| Dining | Kitchen | 80% | [warm white, orange accents] | [slow] |
| Reading | Study | 100% | [neutral white] | [static] |
| Watching TV | Bedroom | 20% | [warm white, color accents] | [medium] |

FIG. 5

RECOMMENDATION ENGINE FOR A LIGHTING SYSTEM

CROSS-REFERENCE TO PRIOR APPLICATIONS

This application is the U.S. National Phase application under 35 U.S.C. § 371 of International Application No. PCT/EP2017/084169, filed on Dec. 21, 2017, which claims the benefit of European Patent Application No. 17153520.6, filed on Jan. 27, 2017. These applications are hereby incorporated by reference herein.

TECHNICAL FIELD

The present invention relates to a recommendation engine for a lighting system, which selectively causes a user interface to output to a user recommendation messages, to recommend lighting effects for the lighting system.

BACKGROUND

Connected lighting refers to a class of lighting system in which the lights (luminaires) can be controlled based on the communication of data between the lights and a controlling device (such as a smartphone, tablet, smart-switch etc.) using network technology, according a network communications protocol or combination of such protocols, such as Zig-Bee, Bluetooth, Wi-Fi, Ethernet etc. This allows a connected lighting system to provide richer functionality than traditional lighting systems, for example allowing a user to directly control the lights using an application (app) executed on a smartphone, wearable device or other user device, and to easily incorporate new control points, such as light switches or sensors, into the lighting system without rewiring it. These rich features enable users to control an increasingly rich set of light parameters (e.g. whites, colours, dim levels, dynamics, etc.) in order to get a pleasant lighting ambiance in an environment.

SUMMARY

As the number of adjustment options increase, user interaction with a connected lighting system can become more complex. To assist users in navigating the increasing rich options available, and to help them make full use of these, there is a need for a "digital assistant" function that helps users to create the optimal light setting for a particular moment. As the number of options increases it becomes more and more likely the user is not aware of all the new options that are created. The digital assistant can help improve this knowledge and also improve the user experiences that the system can provide, by recommending suitable lighting effects for the lighting system to the user.

Technology for recommending lighting effects for lighting system is known in the art. For example, US2015/161137 discloses a method of identifying relevant lighting settings, by comparing lighting system contextual data is compared with stored context data associated with lighting settings in a database. At least some of the lighting settings may be associated with a weighting corresponding to an experience level of the user.

However, the prior art only goes so far as to consider the issue of identifying relevant lighting settings to recommend. It fails to appreciate that, even where a recommendation system might have identified a lighting system it deems relevant to a particular user at a particular time (for whatever reason), the user may not actually have any interest in receiving a recommendation at that time.

Whereas the inventors of the present invention have recognized that the timing of a recommendation has an important effect on user satisfaction; if a recommendation is made when a user is not receptive to receive a recommendation it will be perceived as annoying—even if it is notionally relevant to the current context. Users who are repeatedly presented with a glut of unwanted recommendations may even disable recommendations altogether, even though there may be certain circumstances in which recommendations would be both relevant and—importantly—desired.

In accordance with a first aspect of the present invention, a recommendation engine for a lighting system comprises a recommendation component for generating recommendation messages to recommend lighting effects for the lighting system; at least one data input for receiving, from a data source, data pertaining to a user of the lighting system; and a receptiveness component configured to use the received data to compute a current receptiveness level for the user indicating a current receptiveness of the user to receiving recommendations; wherein the recommendation component is configured to selectively cause recommendation messages to be outputted to the user via a user interface, to recommend lighting effects for the lighting system, in dependence on the current receptiveness level.

Advantageously, this allows recommendation messages to be outputted to the user in a more targeted manner, at times when he is more likely to be receptive to receiving them. In this manner, the number of unwanted recommendation messages can be reduced, removing a source of irritation for the user.

For example, it may be that recommendation messages are outputted to the user by the recommendation component only when the receptiveness level indicates that the user is currently receptive to receiving recommendations, or at least that certain recommendation messages are suppressed by the recommendation component when the receptiveness level indicates the user is not currently receptive to receiving recommendations (suppressed in the sense that at least one recommendation message, which would otherwise be outputted by the recommendation component in a given context, is prevented from being outputted as a consequence of the receptiveness level indicating the user is not currently receptive, for example by preventing a generated recommendation message from being outputted or by preventing the generation of the message altogether).

Generally, the term "receptiveness level" means any measure, qualitative or quantitative, indicative of how receptive the user currently is to receiving recommendation messages for the lighting system. That is, in computing the current receptiveness level, the receptiveness component is using available data from the at least one data source to predict the user's reaction to a recommendation message at that time (where a lower receptiveness level means the user is expected to react less favourably and a higher receptiveness level means the user is expected to react more favourably). That is, the available data is used to gauge information about the user's expected reaction to a recommendation message, where that information is captured in the current receptiveness level.

A second aspect of the present invention is directed to a method of generating recommendation messages to a user of a lighting system, the method comprising implementing, by a recommendation engine, the following steps: receiving, from a data source, data pertaining to the user of the lighting system; and computing, by a receptiveness component of the recommendation engine, a current receptiveness level for the user indicating a current receptiveness of the user to receiving recommendations, using the data received from the data source; and selectively causing, by a recommendation component of the recommendation engine, recommendation messages to be outputted to the user via a user interface, to recommend lighting effects for the lighting system, in dependence on the current receptiveness level.

In embodiments of the first or second aspects, the recommendation component may be configured to receive from the user an acceptance input pertaining to one of the messages, and render the lighting effect recommended by that message in response.

For example, each of the recommendation messages comprises a selectable rendering option, wherein the recommendation component is configured to respond to the user selecting the rendering option (the acceptance input) by causing the at least one illumination source to render the lighting effect recommended by that message.

Alternatively, the acceptance input can, for example, be a voice command, gesture etc.

The recommendation component may be configured to cause recommendation messages to be outputted to the user only when the current receptiveness level exceeds a threshold.

The recommendation component may be configured to determine at least one current property of illumination emitted by at least one illumination source of the lighting system, and selectively cause recommendation messages to be outputted to the user via the user interface, to recommend lighting effects for the at least one illumination source, in dependence on the current receptiveness level and the current property of the illumination.

The recommendation component may be configured to determine the current property of the illumination as functional or aesthetic, wherein recommendation messages are outputted for the at least one illumination source only when its illumination is aesthetic.

The current receptiveness level may be computed using an electronically stored schedule.

For example, the recommendation engine may comprise a learning component configured to update the schedule based on the user's response to the recommendation messages when outputted.

The current receptiveness level may be computed by monitoring interactions between the user and at least one device operated by the user.

The current receptiveness level may be computed by monitoring behaviour exhibited by the user using data from at least one sensor.

For example, the current receptiveness level may be computed based on motion, speech and/or physiological signals of the user as conveyed by the sensor data.

The current receptiveness level may be computed by determining a focus vector of the user, for example using the at least one sensor.

The recommendation engine may comprise a learning component configured to generate learned data by monitoring the user's reaction to recommendation messages over time, wherein the current receptiveness level is computed based on the learned data.

The current receptiveness level may be computed by determining whether the user is in the presence of another user or users.

The recommendation engine may comprise at least two data inputs for receiving data pertaining to the user from different data sources, wherein the current receptiveness level may be generated by combining the data received from the different data sources.

The recommendation engine may comprise a context component configured to determine at least one current context parameter for the user for use in determining a recommendation to make to the user. That is, based on which a recommendation message is generated, assuming the user is currently receptive to the user. Examples of various context parameters are given below.

For example, the recommendation component is configured to compare the context parameter with electronically stored context parameters to locate a matching one of the electronically stored context parameters, and output to the user via the user interface a recommendation message to recommend a lighting effect associated with the matching context parameter only if the current receptiveness level indicates the user is currently receptive to receiving recommendations.

A third aspect of the present invention is directed to a computer program product comprising code stored on a computer readable storage medium and configured when executed to implement the method of the second aspect or any embodiment thereof.

Another aspect of the present invention is directed to a recommendation engine for a lighting system comprising: a recommendation component for generating recommendation messages to recommend lighting effects for the lighting system; at least one data input for receiving, from a data source, data pertaining to a user of the lighting system; and a receptiveness component configured to determine whether to output a recommendation to a user based on the received data; wherein the recommendation component is configured to cause a recommendation message to be outputted to the user via a user interface, to recommend a lighting effect for the lighting system, in response to the receptiveness component determining that a recommendation should be outputted to the user, and wherein the determination of whether or not to output a recommendation to the user is made: using an electronically stored schedule, and/or by monitoring interactions between the user and at least one device operated by the user, and/or by monitoring behaviour exhibited by the user using data from at least one sensor (e.g. based on motion, speech and/or physiological signals of the user as conveyed by the sensor data), and/or using data learned by monitoring the user's reaction to past recommendation messages over time, and/or by determining whether the user is in the presence of another user or users, and/or by determining a focus vector of the user, and/or using an electronically stored schedule.

More generally, that determination can be made based on any element or combination of elements described herein as being used to compute a current receptiveness level (or similar).

BRIEF DESCRIPTION OF FIGURES

For a better understanding of the present invention, and to show how embodiments of the same may be carried into effect, reference is made to the following figures in which:

FIG. 5 shows an example of contexts associated with light settings in a data store.

DETAILED DESCRIPTION OF EXAMPLE EMBODIMENTS

Embodiments of the present invention will now be described by way of example.

A recommendation engine (30, FIG. 3; also referred to as a "digital assistant" herein) makes recommendations to a user (8, FIG. 2) when a suitable suggested setting is clearly recognizable and an improvement of the current situation, and—importantly—at a moment when the user 8 is open to receive the recommendation so that he is not left feeling disturbed or irritated. With recommendations that are both useful and timely, the digital light assistant will be perceived as helpful instead of annoying and enable users to get the most out of the rich capabilities of their connected lighting systems.

As described in further detail below, an association of a preferred light setting(s) (light effect(s)) with a certain context(s) is received. The recommendation engine 30 detects when one of these contexts matches a current context. It detects that whether the user is actually open to receive a recommendation, and if so presents a recommendation message, which may comprise a (selectable) light setting representation, to recommend the light effect associated with the matching context.

Figure 1:
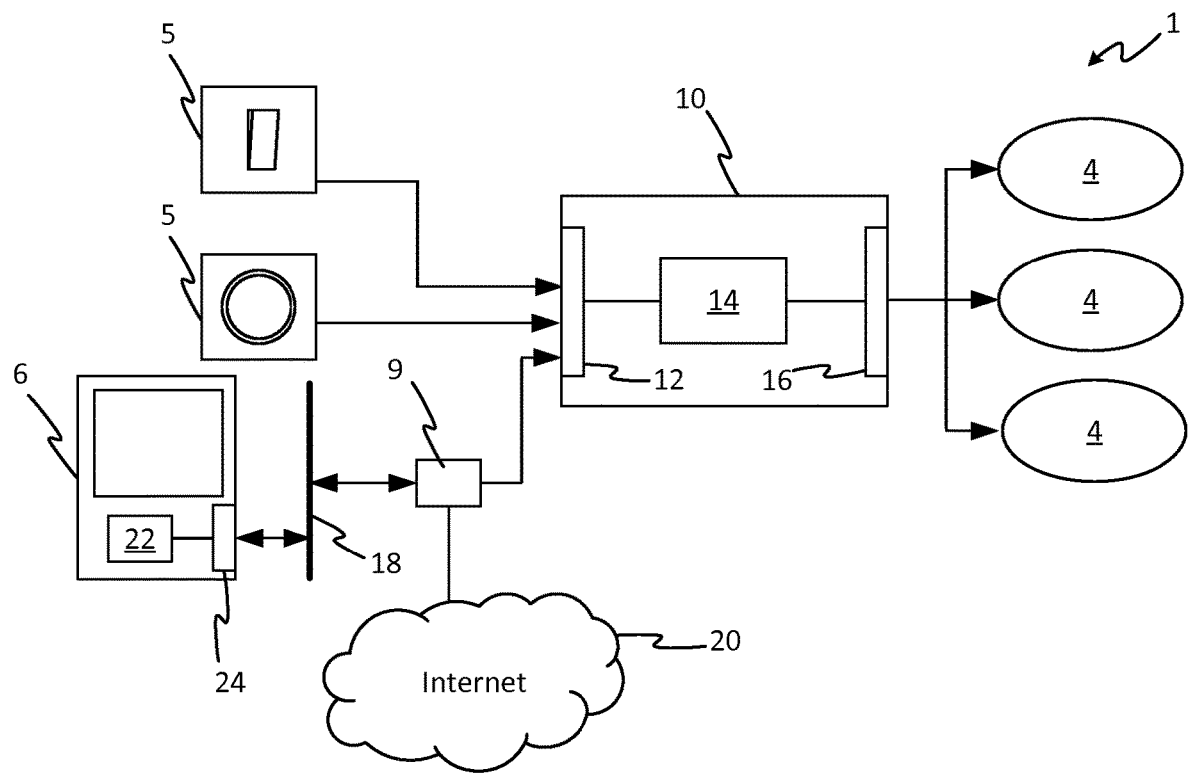
FIG. 1 shows a schematic block diagram of a lighting system.
Figure 2:
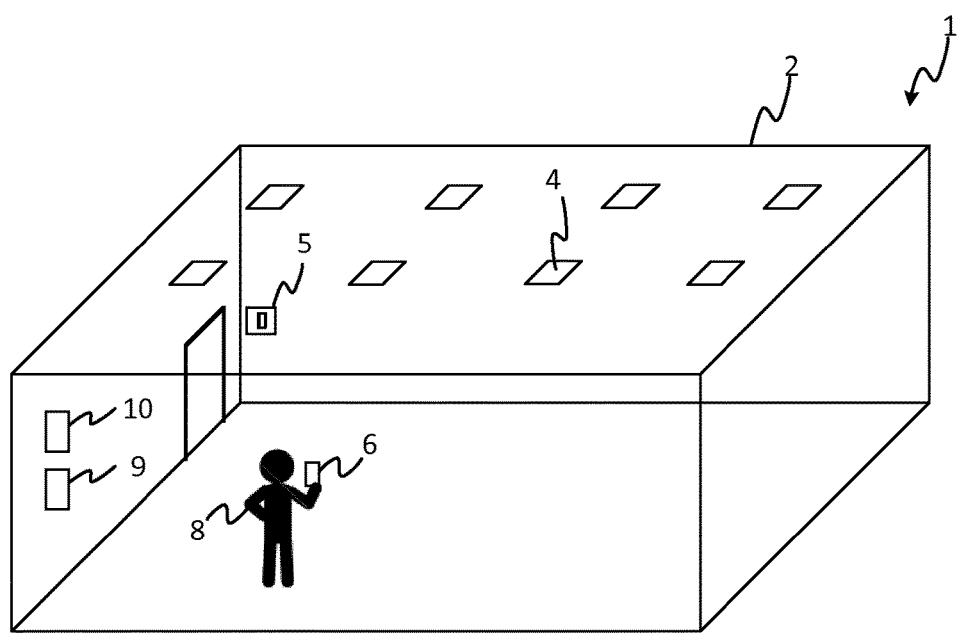
FIG. 2 shows a schematic perspective view of a lighting system located in an environment.

With reference to FIGS. 1 and 2, further details of the recommendation engine 30 are described in the context of a connected lighting system 1. FIG. 1 shows a schematic block diagram of the lighting system 1, and FIG. 2 shows an example of how the lighting system 1 may be arranged in an environment 2 so as to illuminate the environment 2. The environment 2 can comprise an indoor space within a building, such as one or more rooms and/or corridors (or part thereof) and/or may an outdoor space such as a garden or park, or a partially-covered space such as a stadium or gazebo (or part thereof), or a combination of such spaces. In the described examples, the environment 2 is the user's home, or part of his home spanning several rooms of the home, and possibly extending into an outdoor space such as a garden or balcony. The luminaires 4 can for example be ceiling-mounted (as shown), so as to be able to illuminate a surface below them (e.g. the ground or floor, or a work surface), mounted on the wall, embedded in the floor or items of furniture etc. or any combination thereof. Each of the luminaires 4 comprises at least one illumination source, i.e. a light emitting device such as an LED-lamp, gas-discharge lamp or filament bulb, plus any associated housing or support. Each of the luminaires 4 may take any suitable form such as a ceiling or wall mounted luminaire, a free standing luminaire (e.g. table lamp, desk lamp or floor lamp etc.), a wall washer, or a less conventional form such as an LED strip, a luminaire built into a surface or an item of furniture, or any other type of illumination device for emitting illumination into the environment 2 so as to illuminate the environment 2. That is, to emit light of sufficient intensity and over a sufficiently large area that the user 8 in the environment 2 can see his surroundings as a consequence of the illumination.

In addition to the luminaires 4, the lighting system 1 is shown to comprise a central control device in the form of a gateway 10, sometimes referred to as a lighting bridge. The bridge 10 is shown to comprise a first communication interface 12, a second communication interface 16 and a processor 14 connected to the first and second interfaces 12, 16. Each of the luminaires 4 is shown connected to the bridge 10 via the second interface 16. For example the luminaires 4 may form a wireless mesh network where at least some of the luminaires 4 act as relays to relay data between the bridge 10 and other luminaires 4 (that is, at least some of the luminaires 4 connect to the bridge 10 indirectly, via one or more other luminaires 4). This wireless mesh network configuration can extend the range of the network beyond the direct communication range of the second interface 16. For example, the second interface 16 may be a ZigBee interface, where the luminaires 4 and the bridge 10 form a ZigBee network. In order to control the luminaires 4 via the bridge 10, at least one user input device can connect to the first interface 12 of the bridge 10, for example via a wireless connection such as Wi-Fi or Bluetooth or a wired connection e.g. based on Ethernet. The user input device can for example a general-purpose user device 6 executing a lighting control application (app), such as a smartphone, tablet, wearable device, home automation hub (e.g. based on voice control) or any other general-purpose computing device, or a light switch 5 equipped with network communication technology ("smart switch"). A smart switch 5 can take the form of a simple on/off switch, a dimmer switch to provide variable brightness (i.e. luminous intensity) or more advanced switches from which, say, different colours (i.e. chromaticity) of illumination can be selected. In this example a user device 6 is shown connected to the bridge 10 via a local area network 18 provided by a network router 9, such as a Wi-Fi router. In some cases it may also be possible to connect to the bridge 10 from an external network 20 such as the Internet (e.g. e.g. via the router 9) to allow the user 8 to control the luminaires 4 remotely. The user device 6 is shown to comprise a processor 22 on which the lighting control app (not shown) is executed and a network interface 24 via which the processor 22 of the user device 6 can connect to the local area network 18, for example via a Wi-Fi connection. Alternatively the user device 6 can connect to the bridge 10 directly, for example via a Bluetooth connection. It is also possible to implement a connected lighting system without the bridge 10, in which case the various user input devices 5, 6 can control the luminaires 4 by communicating with them directly, for example using Bluetooth (such that neither a bridge 10 nor a router 9 required); alternatively, the luminaires 4 may connect directly to, say, the local network 18, so they can be controlled via the router 9 (such that no bridge 10 required).

By way of example FIG. 2 shows a smart switch 5 disposed in the environment 2 along with the gateway 10 and router 9 with the user device 6 held by the user 8. However as will be appreciated this is merely an example for the purposes of illustration and various other arrangements and configurations are equally viable.

Figure 3:
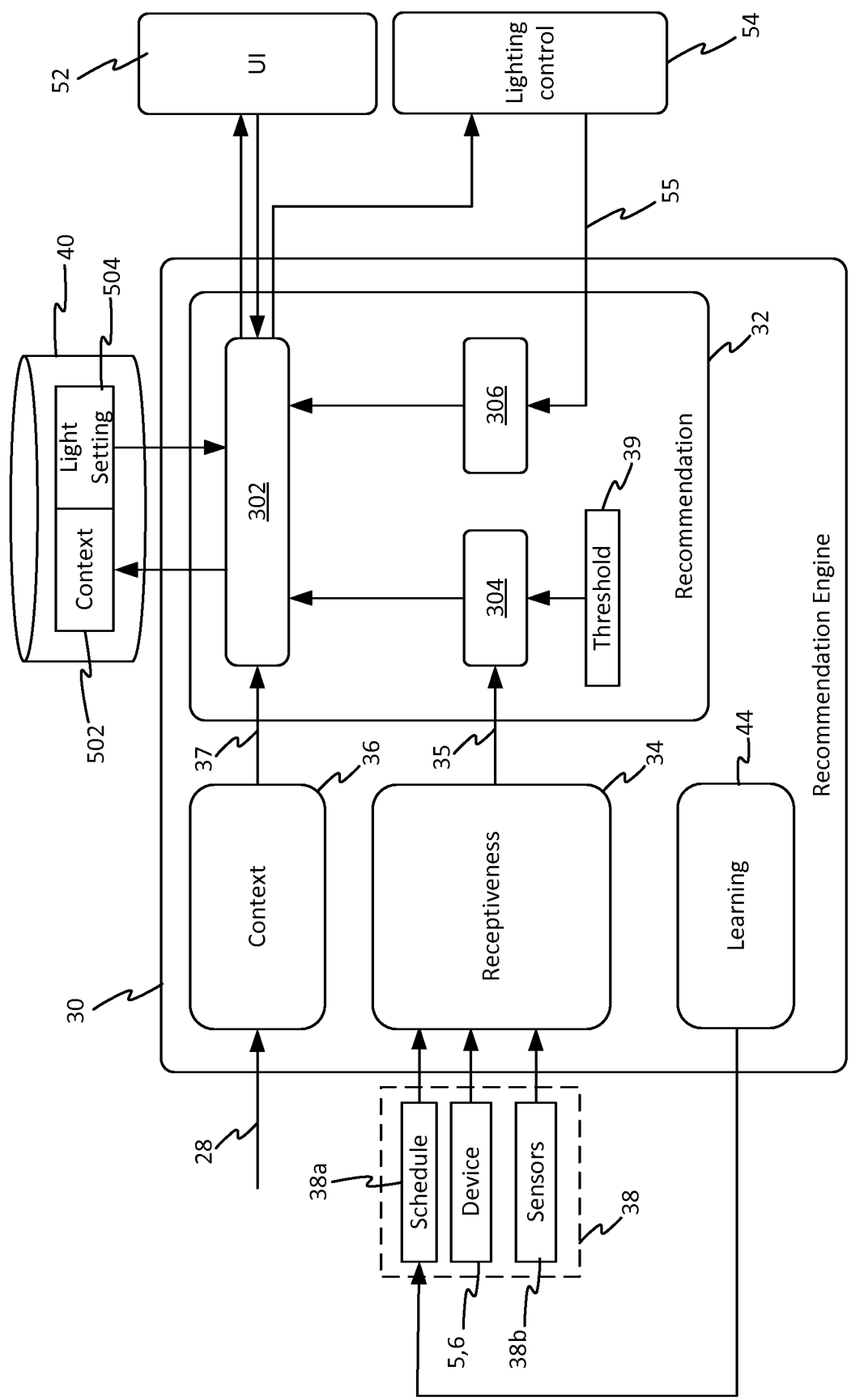
FIG. 3 shows a high-level functional block diagram for a recommendation engine.

FIG. 3 shows functional block diagram representing functionality of the recommendation engine 30 for the lighting system 1. The functionality is implemented by code (i.e. executable instructions) executed on a processor or multiple processors. For example the recommendation engine 30 can be implemented by code executed on the processor of 14 of the bridge 10, on the processor 22 of the user device 6 (e.g. as part of the lighting control app), or even at one or more of the light switches 5 and/or at one or more of the luminaires 4. The functionality of the lighting control system 30 can also be implemented in a distributed fashion, for example (and without limitation) part may be implemented at the bridge 10 and part may be implemented at the user device 6. The possibility of implementing part of this functionality remotely, for example at least in part on one or more devices connected to the external network 20, is also not excluded. For example some all of this functionality may be implemented as a backend service, such as a cloud service.

The recommendation engine 30 is shown to comprise a recommendation component 32, a receptiveness component 34 and a context component 36, each of which represents a different part of the functionality of the recommendation engine 30.

The recommendation component 32 selectively generates and outputs recommendation messages to recommend lighting effects (e.g. a lighting setting or set of lighting settings for one or more of the luminaires 4) to the user 8 of the lighting system.

The context component 36 determines a set of one or more current context parameters 37 for the user 8, which describe a current situation (i.e. context) that is pertinent to the user 8. The current context parameters 37 can be used by the recommendation component 32 to determine a suitable lighting effect to recommend in that context when one is available.

The receptiveness component 34 receives data pertaining to the user 8 from at least one data source, which it uses to compute a current receptiveness level 35 for the user 8. A number of data sources 38 are shown in FIG. 3, which can be used individually or in any combination to compute the receptiveness level 35 as described later. However it is computed, the receptiveness level 35 indicates a current receptiveness of the user 8 to receiving recommendations, and is used by the recommendation component 32 to decide whether or not to actually output a recommendation message to the user 8 in the given context, assuming a suitable recommendation is available. That is to say, even when a suitable recommendation is available, it may be suppressed if the user 8 would not currently be receptive to receiving it.

Figure 4:
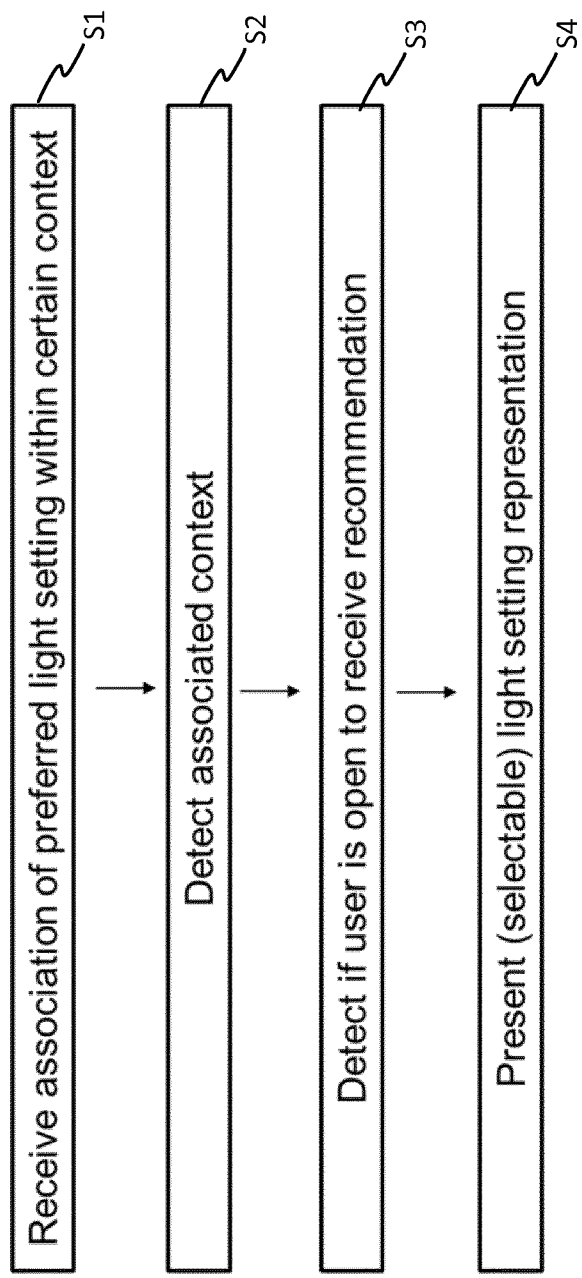
FIG. 4 shows a flowchart for a method of recommending lighting effects for a lighting system.

Further details of the functionality of the recommendation engine 30 will now be described with reference to the block diagram of FIG. 3 and the flow chart of FIG. 4, which are described together.

Step S1—Receive Association of a Preferred Light Setting within a Certain Context.

At step S1, an association of a preferred light setting (lighting effect) 504 with a certain context 502 is received and stored in a data store 40 accessible to the recommendation engine 30, which can comprise local storage, remote storage or a combination of both. This information can contain predetermined associations that are retrieved from a (central) database or via networked information source, for example. That is, the association between a certain context 502 and a preferred light setting 504 can be a predetermined association (e.g. specified by the user 8 or by the lighting system provider, which can also optionally be based on preferred light setting-context associations from other users). Alternatively, an association can be learned based on the actual usage of the lighting system 1 via a self-learning system. Such a learning system can learn which light settings are usually activated and used in which contexts. This can be done for the current user 8, a group of household users, or such relations can be learned on a larger scale. For instance, using so-called collaborative filtering recommender mechanisms whereby the associations can come from (unknown) users which happen to have a high similarity in their respective user profiles (e.g. similar demographics, daily routines, geographic location or similar lighting infrastructures). The context can be specified with various parameters including for example information on location, time, users' presence and activity, characteristics of the physical environment, and ambient light conditions.

This provides the recommendation engine 30 with a source of input on preferred light settings for certain situations/contexts.

In general, the term "context" as used herein refers to one or more parameters that describe the situation of a user. Examples of contextual parameters that can be included, individually or in combination, are:

Activity
Eating, sleeping, reading, watching TV, chatting, waiting, relaxing, concentrating, etc.
Digital activities (gaming, app usage, web browsing, etc.)
Physically active/physically inactive
Mood/mental state
Derived from type of content consumed or status/messages posted on social media
Physiological measurements (e.g. heartbeat, skin conductivity, detected brain activity etc.)
Location
Room, zone
Geographic location
Time
Time of day
Time of year
(personal) calendar event
User presence
Single user/Multi user
User profile information
Physical environment characteristics
Ambient light conditions
Room size
Wall/ceiling surface properties
Lighting infrastructure
Focus vector of user(s)
Location of the user combined with a short period average of the gaze of the user Examples of lighting settings 504 include a set of lighting parameters captured in scenes, routines, effects, or light programs and typically consist of a definition of multiple parameters including hue, saturation, brightness, dynamics, beam width, etc. and how they are rendered on a lighting infrastructure comprising one or more of the luminaires 4. Furthermore, such light settings can either be defined in more abstract terms (e.g. spatial light distribution in the room) or in more concrete terms (individual light settings of individual lighting device types in the room). That is, a light setting to be recommended can be defined by a set of one or more lighting parameters of various different types.

With reference to FIG. 5, the information in the database 40 can for example take the form of table 500 with associations between sets of contextual parameter(s) 502 and corresponding sets of light setting parameter(s), each of which constitutes a light setting 504 as defined by the user 8, a lighting designer, or a lighting (service) company.

In the example of FIG. 5, three context parameter sets 502 are shown, with each set comprising an activity parameter and a location parameter. Each of the three associated lighting parameter sets comprises three types lighting parameters: at least one light intensity parameter (e.g. luminous intensity, expressed relative to the maximum intensity); one or more colour parameters, which define a colour scheme for the illumination; and one or more dynamics parameters, defining visible dynamics for the lighting effect (if any).

Optionally, the association between contextual parameters 502 and light parameters 504 can learned, at least in part, using machine learning techniques from historical usage of the lights, either by the individual user 8 or by a group of users with comparable characteristics, as in typical recommender system applications.

Step S2—Detect the Associated Context

In order to determine whether or not to recommend a light setting and which light setting to recommend, the context component 36 determines (S2) a current (actual) context 37 (i.e. a set of one or more current context parameters) for the user 8 and verifies whether this matches one of the contexts 502 in the data store 40 for which an associated preferred light parameter set 504 is available.

This is represented by block 302 of the receptiveness component 32, which is shown to receive the current context 37, compare it with the contexts 502 in the data store 40 to locate any matching context 502, and retrieve the associated light setting 504 from the data store 40 if a match is found.

The current context 37 can be detected by obtaining current contextual information 28 e.g. via sensor input, external information sources (e.g. Internet, connected devices, etc.), user input, or any combination thereof.

For example, information on the users' activity can be obtained from external information sources (e.g. connected TV that communicates to lighting system that user 8 is watching a movie), via user input (e.g. a smartphone app where the user 8 indicates he is going to sleep), or via sensor input (e.g. a microphone that analysis activity in the room).

Similarly, information on the location of the user 8 can be obtained from external information sources (e.g. location information stored on a bridge or in a smartphone), from user input (e.g. user selecting a room in a smartphone app), or from sensor input (e.g. motion sensor or RF signal strength analysis to identify where the user 8 is currently located).

From the received contextual information 28, the current context 37 is derived as a most likely context for the user 8.

If the current context 37 does match a context 502 in the data store 40, and if the associated light setting 504 for this context 502 is substantially different from the current light setting at the user's location, the method proceeds to step 3 to verify whether the user 8 is actually open ('idle') to receiving the suggestion to change to this preferred light setting 504. A threshold can be defined what is 'substantially different', but at least it should be a difference that is perceivable by a user.

In this step, for optimal helpfulness, the digital assistant 30 should also be aware of the latest options available. So for instance, the digital assistant 30 may be updated continuously with the possibilities of new apps or different (new) options within existing apps, which can be stored in the data store 40 as they become available.

Step S3—Detect that the User is Open to Receiving a Recommendation

To recommend the preferred light setting at an appropriate time, block 304 of the recommendation engine 32 determines (S3) whether or not the user 8 is open to receive it, based on the receptiveness level 35 computed by the receptiveness component 34. If not, then block 304 suppresses the recommendation i.e. prevents block 302 from recommending light setting 504—located at step S2—to the user 8.

The receptiveness of the user can be detected at block 304 in various ways, using information from environmental sensors (e.g. motion sensor), on-body sensors (e.g. heart rate wrist watch), and interaction with a smart device (e.g. activity and app usage).

In this example, block 304 is shown to receive the receptiveness level 35, which is a (numerical) receptiveness value in this example, and compare it with a receptiveness threshold 39 to determine whether or not the user 8 is in a receptive (i.e. idle) state.

The openness to receive the recommendation is referred to as "receptiveness" herein, and the receptiveness value (or other receptiveness level) 35 can be determined in various ways, e.g. derived from a schedule 38a, patterns of interaction between the and one or more of his devices (e.g. switches 5, user device 6 etc.), from sensors 38b, such as environmental sensors, on-body sensors, microphones etc., or any combination of these data sources 38.

For example, the receptiveness to receive a recommendation can be estimated based on inputs from multiple data sources 38 and captured in a receptiveness score, e.g. between 0 (not open to receive suggestion) and 1 (very open to receive suggestion). That is, the receptiveness level may comprise a receptiveness score, which is a numerical value that can vary (pseudo)continuously. The receptiveness threshold 39 (e.g. 0.8) can be defined so that above the threshold 39, a recommendation is presented to the user 8, by block 302, when available.

This threshold 39 can be set and/or adapted by the user 8 or automatically changed based on feedback received from the user 8 on the appropriateness of the received suggestion moments.

To further assist illustration, various example means of determining the receptiveness level 35 will now be described. The receptiveness level 35 may be determined based on any of the following, or any combination thereof.

From a Schedule:

A schedule 38a might be determined that defines when the user 8 is more open to receive a recommendation. For example, a light setting recommendation might always be scheduled in weekends, in evenings (when it's dark), or at less busy moments of the day (e.g. after dinner). Such recommendation schedules can be predetermined by the user 8 or a lighting service provider based on knowledge of regular daily routines. Information in the user's digital calendar can be used to avoid recommendations in busy/occupied time slots. In more advanced embodiments this schedule can be tailored to the actual appreciation of recommendations in the past. That is, a learning component 44 of the recommendation engine 30 can update the schedule 38a based on the user's response to recommendation messages when outputted (see below).

From Device Interaction Patterns:

For example, the user's interaction with the user device 6 can be analysed to determine the best moment to provide the recommendation. If the user 8 is using an app on his smartphone that requires active attention (e.g. reading a story with eBook application), the receptiveness component 34 might infer that the user 8 doesn't want to be disturbed by a lighting recommendation (i.e. low receptiveness level 35).

However, if the user 8 opens the lighting control app on his smartphone, this might be an appropriate moment to recommend the preferred light setting. Similarly, if users are exploring various light scenes and try them out, they might be open to receive a suggestion for a new light scene.

Similarly, the recommendation engine 30 could have knowledge of user's interaction with other smart devices.

For example, if a user is watching a movie on a smart TV and pauses the movie, this might be a moment to provide a light recommendation.

From Detected Conversations:

Connected devices running digital assistant functionality may continuously listen to pick up specific keywords which indicate a user wish or intention. If the user 8 makes a remark about the light, or is having an (open-minded) discussion about light scenes with others, this can indicate that it is a good time to present a light setting suggestion.

From Environmental Sensors:

For example, the activity of the user 8 in a room might be monitored with a motion sensor(s). When there is a high degree of motion in the room, the receptiveness component 34 can infer the user 8 is busy and not open to receive a light recommendation. But when there a low amount of motion detected, it can infer the user 8 is relaxing or not very active and more open to receive a recommendation. The sensor input may also indicate that the user 8 just entered the room, or is changing from one activity to another which may be a good moment to activate or suggest a suitable light setting.

From Focus Vectors:

It is also possible to detect the focus vectors if cameras and gaze detectors are installed in the room. When the focus is rather static and directed to a location with a lot of light, the user 8 is probably concentrating and unreceptive to recommendations. When the focus is directed to a luminaire or lamp 4, there is a high probability that the user 8 is evaluating the lighting infrastructure and might be open for upgrade suggestions.

From On-Body Sensors

The user 8 might have a wearable device that measure physiological signals indicative of arousal or stress levels, including blood pressure, heart rate, and galvanic skin response. In case of high levels of arousal or stress, users are considered not open to receive a lighting recommendation.

From the Presence of Multiple Users

When multiple people are present, or when unknown people are present (e.g. guests of the family), it is less likely that this group of people is open for recommendations on the lighting. Or, to put it another way, the user 8 may be less receptive to recommendations when in the presence of one or more other users.

The selection of the right moment to make a recommendation can be improved by carefully evaluating when the user 8 was open to the new suggestion and when it was rejected or the interruption not appreciated. The user could have asked for recommendations multiple times; what have these moments in common. The learning component 44 of the recommendation engine 30 provides this learning functionality, and can for example update schedules 38*a* and/or other learned data, which in turn influences the timing of future recommendations. That is, the learning component 44 can generate and update various forms of learned data over time, to allow the receptiveness component 34 to learn about the user's receptiveness in different situations based on his response to past recommendations.

Note although steps S2 and S3 are shown in that order, generally they can be performed in any order or in parallel. For example, and without limitation:

The current context 37 may be constantly updated and monitored, to determine whether any recommendations are available; in that case, the current receptiveness level 35 may only be determined if and when a recommendation becomes available, to decide whether or not to present it to the user 8 (i.e. steps S2 and S3 in the order shown);

The user's current receptiveness level 35 may be constantly updated; in that case, the recommendation engine 30 may only determine whether any recommendation is available at times when the user 8 is actually receptive to recommendations (in essence, reversing the order of steps S2 and S3).

The current context 37 and current receptiveness level 35 can each be constantly updated and monitored in parallel (S2 and S3 in parallel). This can require more processing resources, but can also allow greater flexibility.

In some implementations, the determination, at block 304, of whether or not to output a recommendation can be made in dependence on a type of the recommendation. That is, such that for a given receptiveness level 35, whether or not a recommendation is outputted at that level depends on the type of the recommendation; e.g. a scene might be recommended at relatively low receptiveness level, whereas a change to a control rule might be recommended only at relatively high receptiveness level.

Step S4—Output a Recommendation Message

Whenever the user 8 is considered to be 'idle' (i.e. the receptiveness level 34 above the threshold 39 in this example), a recommended light setting 504 for one of the luminaires 4 or a set of the luminaires 4 for the detected context 37 can be presented to the user 8 when available. The recommendation is presented by block 302 as a recommendation message to the user 8 via a user interface 52. That is, as a recommendation message outputted via a user interface (UI) 52 available to the user 8. For example the UI 52 may comprise a display (or other output device) of the user device 6 on which the message is displayed (or otherwise outputted).

Preferably, each message comprises a rendering option (accept option), which is selectable via the UI 52 to render the recommended lighting effect. The user 8 can accept the recommendation by selecting the suggested light setting or reject the recommendation by cancelling, or simply ignoring, the recommendation.

In response to the user 8 accepting the recommendation via UI 52, block 302 causes a lighting control component 54 of the lighting system 1 to control the luminaire(s) 4, to which the recommendation message relates, to render the suggested effect 504. The lighting control component can for example be part of the bridge 10 or user device 6, and generally denoted functionality of the lighting system 1 for controlling lighting emitted by the luminaires 4.

The preferred light setting 504 can for example be presented at the user device 6 by the lighting control app. Users can chose between selectable 'accept' or 'reject' options in order to either change to the preferred light setting or keep the old light setting. Alternatively, in a voice-command based system, the system might initiate a dialogue with the user 8 to suggest the preferred light setting ("Shall I change the light into a Cozy setting?") where the user 8 can either reject or accept the recommended light setting with a voice command. That is, the recommendation message can be outputted as an audible message.

It is also possible that the recommendation of the light setting includes a recommendation to activate the light setting manually with a user interface element. For example, the user 8 may be provided with instructions for applying the setting 504 manually, which can be a useful way for the user 8 to learn features of the system 1.

Optionally, the recommendation engine 30 may be configurable, such that the user 8 can allow it to change the light setting automatically when a matching context 502 is detected. This may be appropriate where the user 8 has received a number of recommendation messages in the past that he has been receptive to, and now decides that he trusts the system enough to select settings autonomously. In this case, presenting the light setting 504 can range from automatically activating the lighting setting to actively prompting or presenting the user with the proposed light setting option, or only subtly presenting the light setting 504 in the lighting control app or in the smartphone menu or dashboard facilitating the user 8 to easily activate the light setting 504. In the case of automatic activation, the light setting may also be activated using a gradual transition from the current light setting, enabling the user to overrule the system action, for instance, using a voice command (e.g. by saying "No, go back to previous light scene").

Extensions:

Optionally, in addition to the receptiveness level 35, the receptiveness component 32 may take into account the current illumination setting of a luminaire 4 or set of luminaires 4 in deciding whether to recommend a setting for that luminaire(s) 4 (e.g. functional white light: don't; relaxing scene with color: do). This is represented by block 306 of FIG. 3, which is shown to receive information pertaining to the current illumination setting 55 from the lighting controller 54, and selectively suppress the outputting of recommendation messages by block 302 in dependence on the received information.

Returning to FIG. 1, each of the processors 14, 22 (or, more generally, whichever processor or combination of processors implements the recommendation engine 30) can for example take the form of a CPU or set of interconnected CPUs, and in general can be any suitable processing apparatus of the device in question which is configured to fetch executable instructions (i.e. code) and execute those instructions in order to carry out the functionality of that device described herein. This can be embedded software (firmware), application software, or any other type of software (or any combination thereof). Alternatively, some or all of this functionality can be implemented in (dedicated) hardware of the device in question, such as an application specific integrated circuit (ASIC) or a field-programmable gate array (FPGA) etc. Accordingly, although in the described embodiments the term "component", "block" (or similar) refers to part of the software of the recommendation engine 30, in general a component/block configured to implement certain functionality can refer to software, hardware or any combination thereof that is operable to carry out that functionality.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A recommendation engine for a lighting system comprising:
   a recommendation component for generating recommendation messages to recommend lighting effects for the lighting system;
   at least one data input for receiving, from a data source, data pertaining to a user of the lighting system; and
   a receptiveness component configured to use the received data to compute a current receptiveness level for the user indicating a current receptiveness of the user to receiving recommendations;
   wherein the recommendation component is configured to selectively cause recommendation messages to be outputted to the user via a user interface, such that recommendation messages are outputted to the user when the current receptiveness level exceeds a threshold and such that recommendation messages are otherwise suppressed.

2. A recommendation engine according to claim 1, wherein the recommendation component is configured to receive from the user an acceptance input pertaining to one of the messages, and cause the at least one illumination source to render the lighting effect recommended by that message in response.

3. A recommendation engine according to claim 2, wherein each of the recommendation messages comprises a selectable rendering option, wherein the recommendation component is configured to respond to the user selecting the rendering option by causing the at least one illumination source to render the lighting effect recommended by that message.

4. A recommendations engine according to claim 1, wherein the recommendation component is configured to determine at least one current property of illumination emitted by at least one illumination source of the lighting system, and selectively cause recommendation messages to be outputted to the user via the user interface, to recommend lighting effects for the at least one illumination source, in dependence on the current receptiveness level and the current property of the illumination.

5. A recommendation engine according to claim 4, wherein the recommendation component is configured to determine the current property of the illumination as functional or aesthetic, wherein recommendation messages are outputted for the at least one illumination source only when its illumination is aesthetic.

6. A recommendation engine according to claim 1, wherein the current receptiveness level is computed using an electronically stored schedule.

7. A recommendation engine according to claim 6, comprising a learning component configured to update the schedule based on the user's response to the recommendation messages when outputted.

8. A recommendation engine according to claim 1, wherein the current receptiveness level is computed by monitoring interactions between the user and at least one device operated by the user.

9. A recommendation engine according to claim 1, wherein the current receptiveness level is computed by monitoring behaviour exhibited by the user using data from at least one sensor.

10. A recommendation engine according to claim 9, wherein the current receptiveness level is computed based on motion, speech and/or physiological signals of the user as conveyed by the sensor data.

11. A recommendation engine according to claim 1, comprising a learning component configured to generate learned data by monitoring the user's reaction to recommendation messages over time, wherein the current receptiveness level is computed based on the learned data.

12. A recommendation engine according to claim 1, comprising a context component configured to determine a current context parameter for the user;

wherein the recommendation component is configured to compare the context parameter with electronically stored context parameters to locate a matching one of the electronically stored context parameters, and output to the user via the user interface a recommendation message to recommend a lighting effect associated with the matching context parameter only if the current receptiveness level indicates the user is currently receptive to receiving recommendations.

13. A method of generating recommendation messages to a user of a lighting system, the method comprising implementing, by a recommendation engine the following steps:

receiving, from a data source, data pertaining to the user of the lighting system; and computing, by a receptiveness component of the recommendation engine, a current receptiveness level for the user indicating a current receptiveness of the user to receiving recommendations, using the data received from the data source; and selectively causing, by a recommendation component of the recommendation engine, recommendation messages to be outputted to the user via a user interface, such that recommendation messages are outputted to the user when the current receptiveness level exceeds a threshold and such that recommendation messages are otherwise suppressed.

14. A computer program product comprising code stored on a computer readable storage medium and configured when executed to implement the method of claim 13.

* * * * *